US012684570B2

(12) United States Patent
Zhu et al.

(10) Patent No.: US 12,684,570 B2
(45) Date of Patent: Jul. 14, 2026

(54) INFORMATION FOR PHYSICAL DOWNLINK SHARED CHANNEL CONFIGURATION

(71) Applicant: LENOVO (BEIJING) LIMITED, Beijing (CN)

(72) Inventors: Chenxi Zhu, Beijing (CN); Bingchao Liu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 406 days.

(21) Appl. No.: 17/642,917

(22) PCT Filed: Sep. 29, 2019

(86) PCT No.: PCT/CN2019/109013

§ 371 (c)(1),
(2) Date: Mar. 14, 2022

(87) PCT Pub. No.: WO2021/056530

PCT Pub. Date: Apr. 1, 2021

(65) Prior Publication Data

US 2022/0369339 A1 Nov. 17, 2022

(51) Int. Cl.
*H04W 72/1273* (2023.01)
*H04L 5/00* (2006.01)
*H04W 72/23* (2023.01)

(52) U.S. Cl.
CPC ....... *H04W 72/1273* (2013.01); *H04L 5/0094* (2013.01); *H04W 72/23* (2023.01)

(58) Field of Classification Search
CPC .. H04W 72/1273; H04W 72/23; H04L 5/0094

(Continued)

(56) References Cited

U.S. PATENT DOCUMENTS

2017/0208572 A1 7/2017 Park et al.
2019/0020506 A1 1/2019 Cheng et al.

(Continued)

FOREIGN PATENT DOCUMENTS

EP        2905910 A1    8/2015
WO        2019099393 A    5/2019

OTHER PUBLICATIONS

R1-1904036 (Year: 2019).*
62791639P (Year: 2019).*
R1-1905610 (Year: 2019).*
International Searching Authority, "Written Opinion of the International Searching Authority," PCT/CN2019/109013, Jun. 17, 2020, pp. 1-3.

(Continued)

*Primary Examiner* — Intekhaab A Siddiquee
(74) *Attorney, Agent, or Firm* — Kunzler Needham & Hilton

(57) ABSTRACT

Apparatuses, methods, and systems are disclosed for transmitting information for PDSCH configurations. One method (400) includes determining (402) configuration information comprising a plurality of instances of a physical downlink shared channel configuration parameter. The method (400) includes transmitting (404) the configuration information to a user equipment, wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

20 Claims, 5 Drawing Sheets

(58) Field of Classification Search
USPC ......................................................... 370/329
See application file for complete search history.

(56) References Cited

U.S. PATENT DOCUMENTS

| | | | |
|---|---|---|---|
| 2019/0045490 A1* | 2/2019 | Davydov ............. | H04L 5/0053 |
| 2019/0149365 A1* | 5/2019 | Chatterjee ............ | H04W 76/11 |
| | | | 370/329 |
| 2019/0150124 A1 | 5/2019 | Nogami et al. | |
| 2019/0158205 A1 | 5/2019 | Sheng et al. | |
| 2019/0268889 A1 | 8/2019 | Kim et al. | |
| 2022/0116964 A1* | 4/2022 | Islam ................. | H04W 72/569 |

OTHER PUBLICATIONS

Oppo, Enhancements on multi-TRP and multi-panel transmission, 3GPP TSG RAN WG1 Meeting #96bis, R1-1904036, Apr. 8-12, 2019, pp. 1-10, Xi'an, China.
Vivo, Further Discussion on Multi-TRP Transmission, 3GPP TSG RAN WG1 Meeting #96bis, R1-1905610, Apr. 8-12, 2019, pp. 1-14, Xi'an, China.
Huawei, Hisilicon, Summary of Enhancements on Multi-TRP/Panel Transmission, 3GPP TSG RAN WG1 Meeting #98, R1-1909602, Aug. 26-30, 2019, pp. 1-76, Prague, Czech Republic.
Ericsson, On multi-TRP and multi-panel, 3GPP TSG RAN WG1 Meeting RAN1#98, R1-1909465, Aug. 26-30, 2019, pp. 1-32, Prague, Czech Republic.

* cited by examiner

100

104

104

102

104

102

102

200

300

400

500

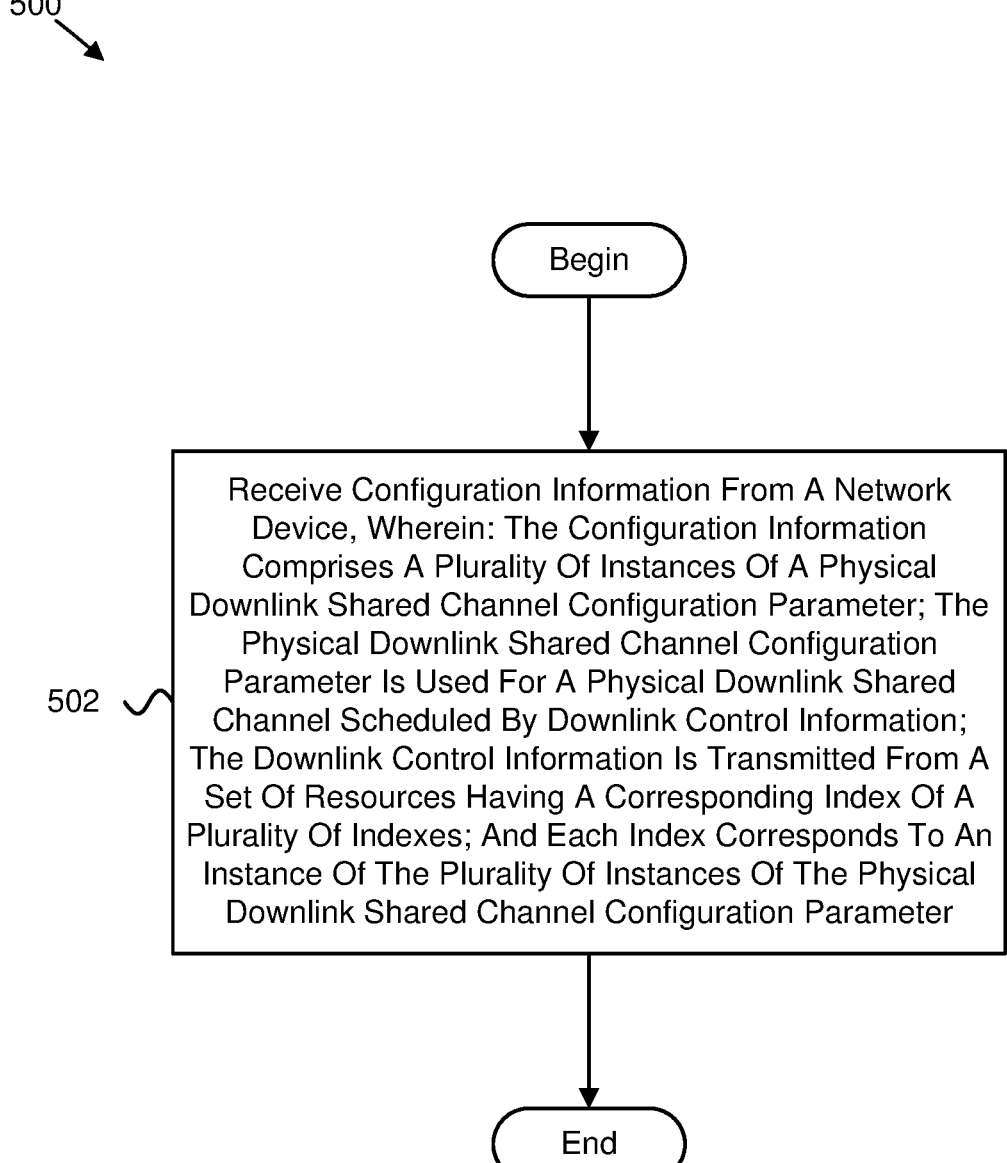

Begin

502    Receive Configuration Information From A Network Device, Wherein: The Configuration Information Comprises A Plurality Of Instances Of A Physical Downlink Shared Channel Configuration Parameter; The Physical Downlink Shared Channel Configuration Parameter Is Used For A Physical Downlink Shared Channel Scheduled By Downlink Control Information; The Downlink Control Information Is Transmitted From A Set Of Resources Having A Corresponding Index Of A Plurality Of Indexes; And Each Index Corresponds To An Instance Of The Plurality Of Instances Of The Physical Downlink Shared Channel Configuration Parameter End

FIG. 5

INFORMATION FOR PHYSICAL DOWNLINK SHARED CHANNEL CONFIGURATION

FIELD

The subject matter disclosed herein relates generally to wireless communications and more particularly relates to information for physical downlink shared channel configuration.

BACKGROUND

The following abbreviations are herewith defined, at least some of which are referred to within the following description: Third Generation Partnership Project ("3GPP"), 5G QoS Indicator ("5QI"), Acknowledge Mode ("AM"), Backhaul ("BH"), Broadcast Multicast ("BM"), Buffer Occupancy ("BO"), Base Station ("BS"), Buffer Status Report ("BSR"), Bandwidth ("BW"), Bandwidth Part ("BWP"), Component Carrier ("CC"), Code Division Multiplexing ("CDM"), Control Element ("CE"), Coordinated Multipoint ("CoMP"), Categories of Requirements ("CoR"), Control Resource Set ("CORESET"), Cyclic Prefix ("CP"), Cyclic Prefix OFDM ("CP-OFDM"), CSI-RS Resource Indicator ("CRI"), Cell RNTI ("C-RNTI"), Channel State Information ("CSI"), CSI IM ("CSI-IM"), CSI RS ("CSI-RS"), Channel Quality Indicator ("CQI"), Central Unit ("CU"), Codeword ("CW"), Downlink Assignment Index ("DAI"), Downlink Control Information ("DCI"), Downlink ("DL"), Discrete Fourier Transform Spread OFDM ("DFT-s-OFDM"), Demodulation Reference Signal ("DMRS" or "DM-RS"), Data Radio Bearer ("DRB"), Dedicated Short-Range Communications ("DSRC"), Distributed Unit ("DU"), Enhanced Mobile Broadband ("eMBB"), Evolved Node B ("eNB"), Enhanced Subscriber Identification Module ("eSIM"), Enhanced ("E"), Frequency Division Duplex ("FDD"), Frequency Division Multiple Access ("FDMA"), Frequency Range ("FR"), 450 MHz-6000 MHz ("FR1"), 24250 MHz-52600 MHz ("FR2"), Hybrid Automatic Repeat Request ("HARQ"), High-Definition Multimedia Interface ("HDMI"), Integrated Access Backhaul ("IAB"), Identity or Identifier or Identification ("ID"), Information Element ("IE"), Interference Measurement ("IM"), International Mobile Subscriber Identity ("IMSI"), Internet-of-Things ("IoT"), Internet Protocol ("IP"), Joint Transmission ("JT"), Level 1 ("L1"), L1 RSRP ("L1-RSRP"), L1 SINR ("L1-SINR"), Logical Channel ("LCH"), Logical Channel Group ("LCG"), Logical Channel ID ("LCID"), Logical Channel Prioritization ("LCP"), Layer Indicator ("LI"), Long Term Evolution ("LTE"), Levels of Automation ("LoA"), Medium Access Control ("MAC"), Modulation Coding Scheme ("MCS"), Multi DCI ("M-DCI"), Master Information Block ("MIB"), Multiple Input Multiple Output ("MIMO"), Mobile-Termination ("MT"), Machine Type Communication ("MTC"), Multi PDSCH ("Multi-PDSCH"), Multi TRP ("M-TRP"), Multi-User ("MU"), Multi-User MIMO ("MU-MIMO"), Minimum Mean Square Error ("MMSE"), Negative-Acknowledgment ("NACK") or ("NAK"), Next Generation ("NG"), Next Generation Node B ("gNB"), New Radio ("NR"), Non-Zero Power ("NZP"), NZP CSI-RS ("NZP-CSI-RS"), Orthogonal Frequency Division Multiplexing ("OFDM"), Peak-to-Average Power Ratio ("PAPR"), Physical Broadcast Channel ("PBCH"), Physical Downlink Control Channel ("PDCCH"), Physical Downlink Shared Channel ("PDSCH"), PDSCH Configuration ("PDSCH-Config"), Policy Control Function ("PCF"), Packet Data Convergence Protocol ("PDCP"), Packet Data Network ("PDN"), Protocol Data Unit ("PDU"), Public Land Mobile Network ("PLMN"), Precoding Matrix Indicator ("PMI"), ProSe Per Packet Priority ("PPPP"), ProSe Per Packet Reliability ("PPPR"), Physical Resource Block ("PRB"), Packet Switched ("PS"), Physical Sidelink Control Channel ("PSCCH"), Physical Sidelink Shared Channel ("PSSCH"), Phase Tracking RS ("PTRS" or "PT-RS"), Physical Uplink Shared Channel ("PUSCH"), Quasi Co-Located ("QCL"), Quality of Service ("QoS"), Random Access Channel ("RACH"), Radio Access Network ("RAN"), Radio Access Technology ("RAT"), Resource Element ("RE"), Radio Frequency ("RF"), Rank Indicator ("RI"), Radio Link Control ("RLC"), Radio Link Failure ("RLF"), Radio Network Temporary Identifier ("RNTI"), Resource Pool ("RP"), Radio Resource Control ("RRC"), Reference Signal ("RS"), Reference Signal Received Power ("RSRP"), Reference Signal Received Quality ("RSRQ"), Receive ("RX"), Single Carrier Frequency Domain Spread Spectrum ("SC-FDSS"), Secondary Cell ("SCell"), Sub Carrier Spacing ("SCS"), Single DCI ("S-DCI"), Service Data Unit ("SDU"), Subscriber Identity Module ("SIM"), Signal-to-Interference Ratio ("SINR"), Sidelink ("SL"), Sequence Number ("SN"), Scheduling Request ("SR"), SRS Resource Indicator ("SRI"), Sounding Reference Signal ("SRS"), Synchronization Signal ("SS"), SS/PBCH Block ("SSB"), Transmission Configuration Indicator ("TCI"), Time Division Duplex ("TDD"), Temporary Mobile Subscriber Identity ("TMSI"), Transmitted Precoding Matrix Indicator ("TPMI"), Transmission Reception Point ("TRP"), Technical Standard ("TS"), Transmit ("TX"), User Entity/Equipment (Mobile Terminal) ("UE"), Universal Integrated Circuit Card ("UICC"), Uplink ("UL"), Unacknowledged Mode ("UM"), Universal Mobile Telecommunications System ("UMTS"), User Plane ("UP"), Universal Subscriber Identity Module ("USIM"), Universal Terrestrial Radio Access Network ("UTRAN"), Vehicle to Everything ("V2X"), Voice Over IP ("VoIP"), Visited Public Land Mobile Network ("VPLMN"), Vehicle RNTI ("V-RNTI"), Worldwide Interoperability for Microwave Access ("WiMAX"), Zero Forcing ("ZF"), Zero Power ("ZP"), and ZP CSI-RS ("ZP-CSI-RS"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, a M-TRP may be used. In such networks, each TRP may have unique configuration parameters.

BRIEF SUMMARY

Methods for transmitting information for PDSCH configurations are disclosed. Apparatuses and systems also perform the functions of the methods. In one embodiment, the method includes determining configuration information comprising a plurality of instances of a physical downlink shared channel configuration parameter. In certain embodiments, the method includes transmitting the configuration information to a user equipment, wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

An apparatus for transmitting information for PDSCH configurations, in one embodiment, includes a processor that determines configuration information comprising a plurality of instances of a physical downlink shared channel configuration parameter. In various embodiments, the apparatus includes a transmitter that transmits the configuration information to a user equipment, wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

In one embodiment, a method for receiving information for PDSCH configurations includes receiving configuration information from a network device, wherein: the configuration information comprises a plurality of instances of a physical downlink shared channel configuration parameter; the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

An apparatus for receiving information for PDSCH configurations, in one embodiment, includes a receiver that receives configuration information from a network device, wherein: the configuration information comprises a plurality of instances of a physical downlink shared channel configuration parameter; the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic flow chart diagram illustrating one embodiment of a method for receiving information for PDSCH configurations.

DETAILED DESCRIPTION

Figure 1:
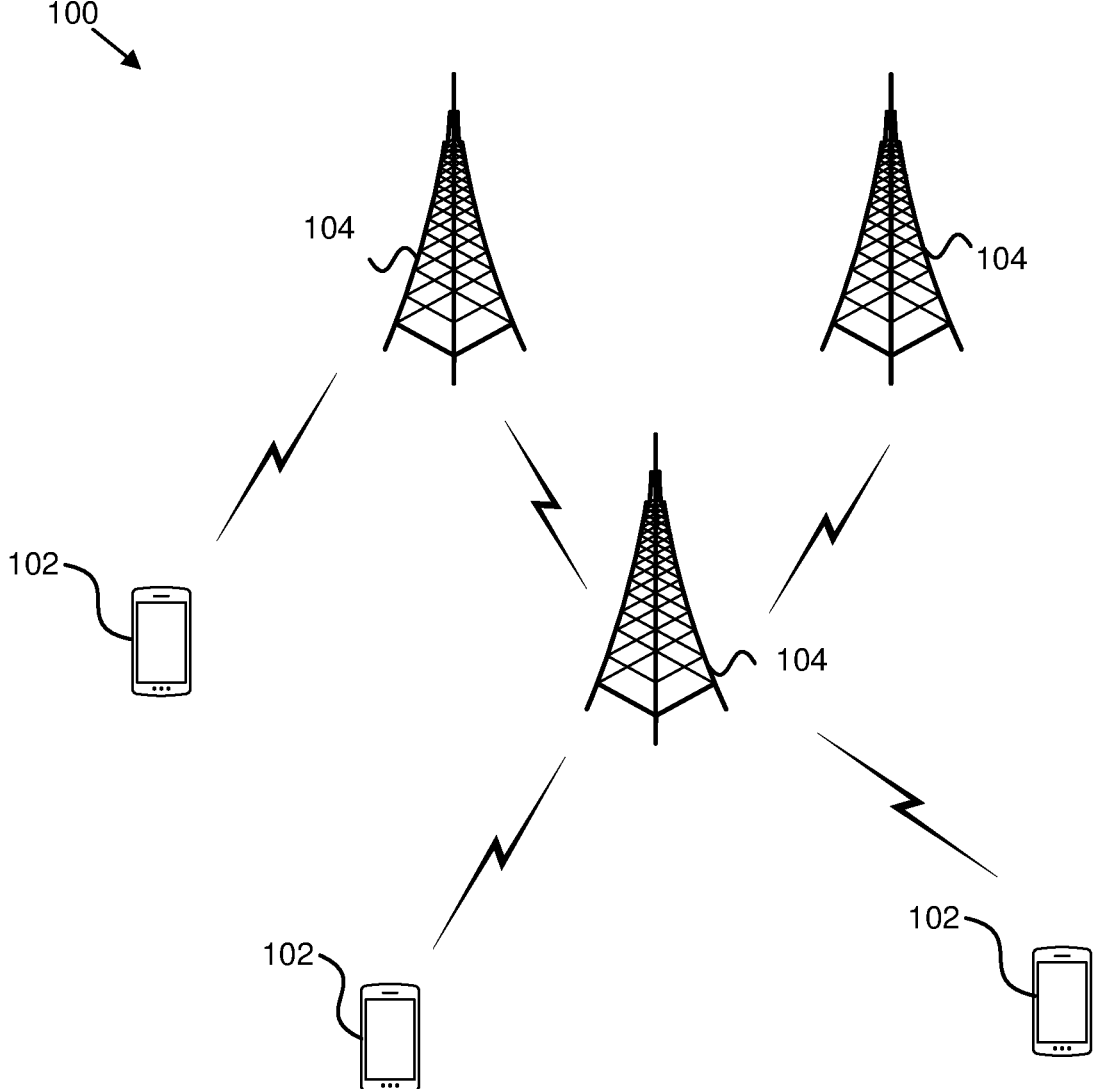
FIG. 1 is a schematic block diagram illustrating one embodiment of a wireless communication system for transmitting and/or receiving information for PDSCH configurations.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving information for PDSCH configurations. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals and/or the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a RAN, a relay node, a device, a network device, an IAB node, a donor IAB node, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 5G or NG (Next Generation) standard of the 3GPP protocol, wherein the network unit 104 transmits using NG RAN technology. More generally, however, the wireless communication system 100 may implement some other open or proprietary communication protocol, for example, WiMAX, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a network unit 104 may determine configuration information comprising a plurality of instances of a physical downlink shared channel configuration parameter. In certain embodiments, the network unit 104 may transmit the configuration information to a user equipment (e.g., remote unit 102), wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter. Accordingly, a network unit 104 may be used for transmitting information for PDSCH configurations.

In some embodiments, a remote unit 102 may receive configuration information from a network device (e.g., network unit 104), wherein: the configuration information comprises a plurality of instances of a physical downlink shared channel configuration parameter; the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter. Accordingly, a remote unit 102 may be used for receiving information for PDSCH configurations.

Figure 2:
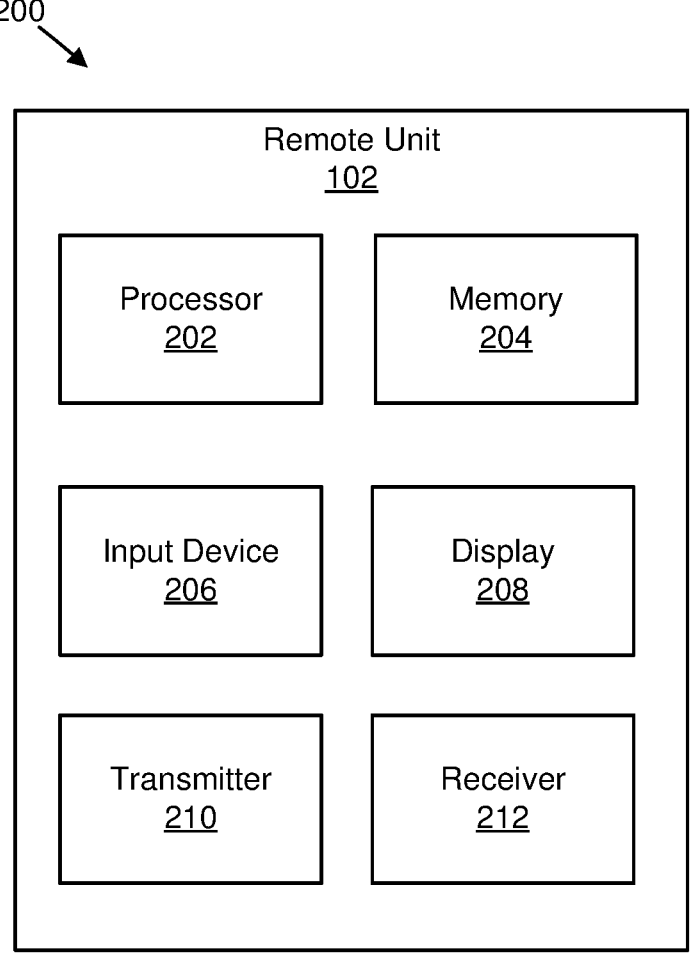
FIG. 2 is a schematic block diagram illustrating one embodiment of an apparatus that may be used for receiving information for PDSCH configurations.

FIG. 2 depicts one embodiment of an apparatus 200 that may be used for receiving information for PDSCH configurations. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104. In one embodiment, the receiver 212 receives configuration information from a network device (e.g., network unit 104), wherein: the configuration information comprises a plurality of instances of a physical downlink shared channel configuration parameter; the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
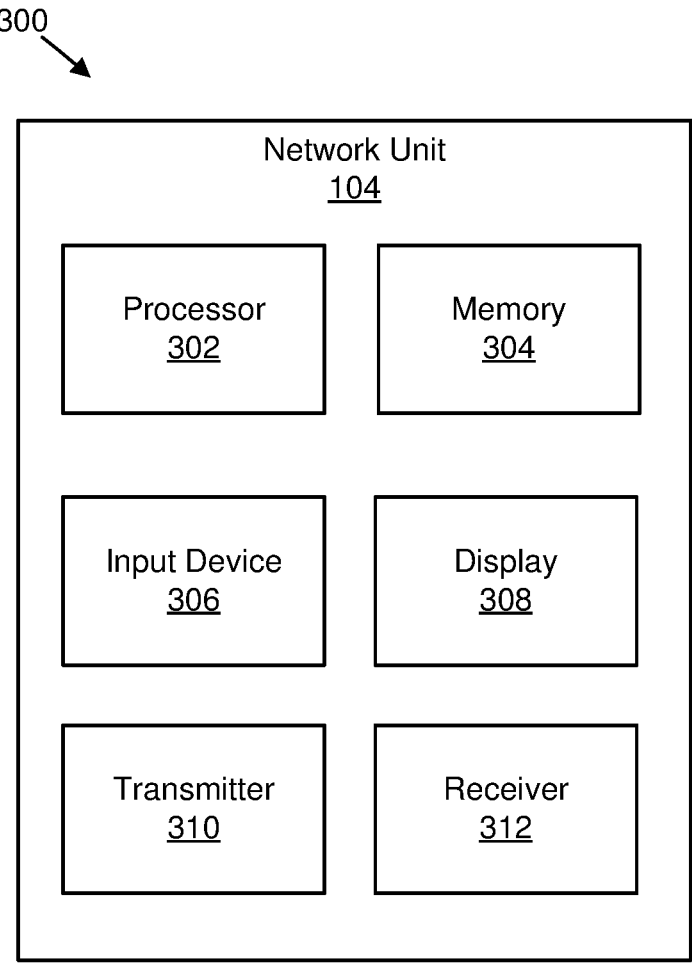
FIG. 3 is a schematic block diagram illustrating one embodiment of an apparatus that may be used for transmitting information for PDSCH configurations.

FIG. 3 depicts one embodiment of an apparatus 300 that may be used for transmitting information for PDSCH configurations. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302 determines configuration information comprising a plurality of instances of a physical downlink shared channel configuration parameter. In various embodiments, the transmitter 310 transmits the configuration information to a user equipment (e.g., remote unit 102), wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In various configurations, both S-DCI and M-DCI based M-TRP DL transmission may be used with either ideal backhaul or non-ideal backhaul. In some embodiments, for M-DCI scheduled multi-PDSCH, each TRP transmits its own PDSCH scheduled by a PDCCH. In such embodiments, some details of the PDSCH may be configured semi-statically in advance in RRC, while other details may be signaled dynamically in DCI. If a UE receives a DCI format 1_1 scheduling a PDSCH, the UE may need to determine which RRC parameter to use to decode the PDSCH. Various embodiments described herein correspond to an association between an RRC configured PDSCH-Config and DCI (e.g., which RRC parameter a UE should use for receiving a PDSCH from one of more TRPs).

In some configurations, only single TRP transmission is used, so a UE will receive PDSCH and PDCCH from the same TRP. In such configurations, there is only 1 DCI Format 1_1 sent from the TRP (e.g., gNB), only 1 RRC configured PDSCH-Config, and each field in the PDSCH-Config contains only a single value. Because there is only one TRP, there is no ambiguity about which parameter in the PDSCH-Config the fields in DCI format 1_1 refer to. For example, there is only one "dataScramblingIdentiltyPDSCH" parameter configured in the PDSCH-Config, and the UE uses this value to descramble all PDSCHs received. Similarly, there is only a single entry for the "dmrs-DownlinkForPDSCH-MappingTypeA" parameter in the PDSCH-Config, and UE the uses the "Antenna ports" field in DCI format 1_1 to refer to one of the configured DMRS configurations in RRC to determine the antenna ports and CDM groups in the received PDSCH.

Table 1 shows one embodiment of a PDSCH-Config IE and Table 2 shows one embodiment of field descriptions corresponding to the PDSCH-Config IE.

TABLE 1

PDSCH-Config Information Element

```
-- ASN1START
-- TAG-PDSCH-CONFIG-START
PDSCH-Config ::=                            SEQUENCE {
    dataScramblingIdentityPDSCH                 INTEGER (0..1023)
```

TABLE 1-continued

PDSCH-Config Information Element

```
OPTIONAL,                    -- Need S
  dmrs-DownlinkForPDSCH-MappingTypeA          SetupRelease { DMRS-DownlinkConfig }
OPTIONAL,                    -- Need M
  dmrs-DownlinkForPDSCH-MappingTypeB          SetupRelease { DMRS-DownlinkConfig }
OPTIONAL,                    -- Need M
  tci-StatesToAddModList                      SEQUENCE (SIZE(1..maxNrofTCI-States)) OF TCI-State
OPTIONAL,                    -- Need N
  tci-StatesToReleaseList                     SEQUENCE (SIZE(1..maxNrofTCI-States)) OF TCI-
StateId                      OPTIONAL,    -- Need N
  vrb-ToPRB-Interleaver                       ENUMERATED {n2, n4}
OPTIONAL,                    -- Need S
  resourceAllocation                          ENUMERATED { resourceAllocationType0,
resourceAllocationType1, dynamicswitch},
  pdsch-TimeDomainAllocationList              SetupRelease { PDSCH-
TimeDomainResourceAllocationList }              OPTIONAL,   -- Need M
  pdsch-AggregationFactor                     ENUMERATED { n2, n4, n8 }
OPTIONAL,                    -- Need S
  rateMatchPatternToAddModList                SEQUENCE (SIZE (1..maxNrofRateMatchPatterns)) OF
RateMatchPattern             OPTIONAL,    -- Need N
  rateMatchPatternToReleaseList               SEQUENCE (SIZE (1..maxNrofRateMatchPatterns)) OF
RateMatchPatternId           OPTIONAL,    -- Need N
  rateMatchPatternGroup1                      RateMatchPatternGroup
OPTIONAL,                    -- Need R
  rateMatchPatternGroup2                      RateMatchPatternGroup
OPTIONAL,                    -- Need R
  rbg-Size                                    ENUMERATED {config1, config2},
  mcs-Table                                   ENUMERATED {qam256, qam64LowSE}
OPTIONAL,                    -- Need S
  maxNrofCodeWordsScheduledByDCI              ENUMERATED {n1, n2}
OPTIONAL,                    -- Need R
  prb-BundlingType                            CHOICE {
    staticBundling                              SEQUENCE {
                      bundleSize                   ENUMERATED { n4, wideband }
OPTIONAL                     -- Need S
    },
    dynamicBundling                             SEQUENCE {
                      bundleSizeSet1               ENUMERATED { n4, wideband, n2-wideband, n4-
wideband }                   OPTIONAL,    -- Need S
                      bundleSizeSet2               ENUMERATED { n4, wideband }
OPTIONAL                     -- Need S
    }
  },
  zp-CSI-RS-ResourceToAddModList              SEQUENCE (SIZE (1..maxNrofZP-CSI-RS-
Resources)) OF ZP-CSI-RS-Resource
OPTIONAL,                    -- Need N
  zp-CSI-RS-ResourceToReleaseList             SEQUENCE (SIZE (1..maxNrofZP-CSI-RS-
Resources)) OF ZP-CSI-RS-ResourceId
OPTIONAL,                    -- Need N
  aperiodic-ZP-CSI-RS-ResourceSetsToAddModList   SEQUENCE (SIZE (1..maxNrofZP-CSI-RS-
ResourceSets)) OF ZP-CSI-RS-ResourceSet
OPTIONAL,                    -- Need N
  aperiodic-ZP-CSI-RS-ResourceSetsToReleaseList  SEQUENCE (SIZE (1..maxNrofZP-CSI-RS-
ResourceSets)) OF ZP-CSI-RS-ResourceSetId
OPTIONAL,                    -- Need N
  sp-ZP-CSI-RS-ResourceSetsToAddModList       SEQUENCE (SIZE (1..maxNrofZP-CSI-RS-ResourceSets))
OF ZP-CSI-RS-ResourceSet
OPTIONAL,                    -- Need N
  sp-ZP-CSI-RS-ResourceSetsToReleaseList      SEQUENCE (SIZE (1..maxNrofZP-CSI-RS-ResourceSets))
OF ZP-CSI-RS-ResourceSetId
OPTIONAL,                    -- Need N
  p-ZP-CSI-RS-ResourceSet                     SetupRelease { ZP-CSI-RS-ResourceSet }
OPTIONAL,                    -- Need M
  ...
}
RateMatchPatternGroup ::=                      SEQUENCE (SIZE (1..maxNrofRateMatchPatternsPerGroup))
OF CHOICE {
  cellLevel                                   RateMatchPatternId,
  bwpLevel                                    RateMatchPatternId
}
-- TAG-PDSCH-CONFIG-STOP
-- ASN1STOP
```

TABLE 2

| PDSCH-Config Field Descriptions | |
|---|---|
| aperiodic-ZP-CSI-RS-ResourceSetsToAddModList | AddMod and/or Release lists for configuring aperiodically triggered zero-power CSI-RS resource sets. Each set contains a ZP-CSI-RS-ResourceSetId and the IDs of one or more ZP-CSI-RS-Resources (the actual resources are defined in the zp-CSI-RS-ResourceToAddModList). The network configures the UE with at most 3 aperiodic ZP-CSI-RS-ResourceSets and it uses only the ZP-CSI-RS-ResourceSetId 1 to 3. The network triggers a set by indicating its ZP-CSI-RS-ResourceSetId in the DCI payload. The DCI codepoint '01' triggers the resource set with ZP-CSI-RS-ResourceSetId 1, the DCI codepoint '10' triggers the resource set with ZP-CSI-RS-ResourceSetId 2, and the DCI codepoint '11' triggers the resource set with ZP-CSI-RS-ResourceSetId 3 (see TS 38.214, clause 5.1.4.2) |
| dataScramblingIdentityPDSCH | Identifier used to initialize data scrambling (c_init) for PDSCH. If the field is absent, the UE applies the physical cell ID. (see TS 38.211, clause 7.3.1.1). |
| dmrs-DownlinkForPDSCH-MappingTypeA | DMRS configuration for PDSCH transmissions using PDSCH mapping type A (chosen dynamically via PDSCH-TimeDomainResourceAllocation). Only the fields dmrs-Type, dmrs-AdditionalPosition and maxLength may be set differently for mapping type A and B. |
| dmrs-DownlinkForPDSCH-MappingTypeB | DMRS configuration for PDSCH transmissions using PDSCH mapping type B (chosen dynamically via PDSCH-TimeDomainResourceAllocation). Only the fields dmrs-Type, dmrs-AdditionalPosition and maxLength may be set differently for mapping type A and B. |
| maxNrofCodeWordsScheduledByDCI | Maximum number of code words that a single DCI may schedule. This changes the number of MCS/RV/NDI bits in the DCI message from 1 to 2. |
| mcs-Table | Indicates which MCS table the UE shall use for PDSCH. (see TS 38.214, clause 5.1.3.1). If the field is absent the UE applies the value 64QAM. |
| pdsch-AggregationFactor | Number of repetitions for data (see TS 38.214, clause 5.1.2.1). When the field is absent the UE applies the value 1. |
| pdsch-TimeDomainAllocationList | List of time-domain configurations for timing of DL assignment to DL data (see table 5.1.2.1.1-1 in TS 38.214). |
| prb-BundlingType | Indicates the PRB bundle type and bundle size(s) (see TS 38.214, clause 5.1.2.3). If dynamic is chosen, the actual bundleSizeSet1 or bundleSizeSet2 to use is indicated via DCI. Constraints on bundleSize(Set) setting depending on vrb-ToPRB-Interleaver and rbg-Size settings are described in TS 38.214 [19], clause 5.1.2.3. If a bundleSize(Set) value is absent, the UE applies the value n2. |
| p-ZP-CSI-RS-ResourceSet | A set of periodically occurring ZP-CSI-RS-Resources (the actual resources are defined in the zp-CSI-RS-ResourceToAddModList). The network uses the ZP-CSI-RS-ResourceSetId = 0 for this set. |
| rateMatchPatternGroup1 | The IDs of a first group of RateMatchPatterns defined in PDSCH-Config –> rateMatchPatternToAddModList (BWP level) or in ServingCellConfig –> rateMatchPatternToAddModList (cell level). These patterns can be activated dynamically by DCI (see TS 38.214, clause 5.1.4.1). |

TABLE 2-continued

| PDSCH-Config Field Descriptions | |
| --- | --- |
| rateMatchPatternGroup2 | The IDs of a second group of RateMatchPatterns defined in PDSCH-Config –> rateMatchPatternToAddModList (BWP level) or in ServingCellConfig –> rateMatchPatternToAddModList (cell level). These patterns can be activated dynamically by DCI (see TS 38.214, clause 5.1.4.1). |
| rateMatchPatternToAddModList | Resources patterns which the UE should rate match PDSCH around. The UE rate matches around the union of all resources indicated in the nested bitmaps (see TS 38.214, clause 5.1.4.1). FFS: RAN1 indicates that there should be a set of patterns per cell and one per BWP => Having both seems unnecessary. |
| rbg-Size | Selection between config 1 and config 2 for RBG size for PDSCH. The UE ignores this field if resourceAllocation is set to resourceAllocationType1 (see TS 38.214, clause 5.1.2.2.1). |
| resourceAllocation | Configuration of resource allocation type 0 and resource allocation type 1 for non-fallback DCI (see TS 38.214, clause 5.1.2.2). |
| sp-ZP-CSI-RS-ResourceSetsToAddModList | AddMod and/or Release lists for configuring semi-persistent zero-power CSI-RS resource sets. Each set contains a ZP-CSI-RS-ResourceSetId and the IDs of one or more ZP-CSI-RS-Resources (the actual resources are defined in the zp-CSI-RS-ResourceToAddModList) (see TS 38.214, clause 5.1.4.2). |
| tci-StatesToAddModList | A list of TCI states indicating a transmission configuration which includes QCL-relationships between the DL RSs in one RS set and the PDSCH DMRS ports (see TS 38.214, clause 5.1.5). |
| vrb-ToPRB-Interleaver | Interleaving unit configurable between 2 and 4 PRBs (see TS 38.211, clause 7.3.1.6). When the field is absent, the UE performs non-interleaved VRB-to-PRB mapping. |
| zp-CSI-RS-ResourceToAddModList | A list of ZP CSI-RS resources used for PDSCH rate-matching. Each resource in this list may be referred to from only one type of resource set, i.e., aperiodic, semi-persistent or periodic (see TS 38.214). |

In certain embodiments that use M-DCI M-TRP transmission, each TRP transmits its own PDSCH scheduled by its own PDCCH. As may be appreciated, different PDSCHs transmitted from different TRPs may use different data scrambling IDs (e.g., dataScramblingIdentityPDSCH), different DMRS configurations (e.g., dmrs-DownlinkForPDSCH-MappingTypeA, dmrs-DownlinkForPDSCH-MappingTypeB), different TCI states (e.g., tci-StatesToAddModList, tci-StatesToReleaseList), and/or other different PDSCH transmission parameters. In some embodiments, different RRC parameters for different TRPs may be configured in the same PDSCH-Config IE with multiple fields, and, in other embodiments, different RRC parameters for different TRPs may be configured in multiple PDSCH-Config IEs. For example, if there are 2 TRPs, two different data scrambling IDs, two different dmrs-DownlinkForPDSCH-MappingTypeA, two different dmrs-DownlinkForPDSCH-MappingTypeB, and/or two different TCI states configurations may be provided in the same PDSCH-Config IE in RRC. As another example, two sets of transmission parameters in different PDSCH-Config IEs may be configured by RRC.

In various embodiments, to distinguish DCIs transmitted from different TRPs, an index (e.g., higher layer index) may be defined for one or more different set of resources that may be used by TRPs (e.g., CORESETs). As may be appreciated, each TRP may be configured to use a different set of resources or multiple sets of resources, therefore, the index may indicate a set of resources or multiple sets of resources which further indicate a specific TRP. In certain embodiments, a PDCCH containing DCI is transmitted in a set of resources and, therefore, is associated with an index. In such embodiments, the index is different from a CORESET ID and may be used to associate a set of resources or multiple sets of resources with a specific TRP. In some embodiments, multiple sets of resources (e.g., CORESETs) transmitted from the same TRP may be considered to be in a group (e.g., CORESET group) having the same index for each set of resources in the group.

In a first embodiment, multiple different PDSCH RRC parameters may be configured in the same PDSCH-Config IE, and a UE selects which parameter to use based on an index corresponding to a set of resources (e.g., CORESET) in which the UE receives scheduling DCI. In certain embodiments, if there are an N number of the same type of parameters, such as data scrambling IDs or DMRS configurations, configured in the same PDSCH-Config IE, a list of N indexes may also be included in the PDSCH-Config IE. In such embodiments, there may be a one-to-one relationship between each instance of an RRC parameter and each index value. Furthermore, if there is only one instance of an RRC parameter included in the PDSCH-Config IE, the single instance of the RRC parameter may apply to all index values. In various embodiments, if a UE receives scheduling DCI from a set of resources with an nth configured index (e.g., nth index with a first index in a list being 1 and counting upward by is in the list), the UE applies a corresponding nth configured RRC parameter, such as data scrambling ID, dmrs-DownlinkForPDSCH-MappingTypeA, dmrs-DownlinkForPDSCH-MappingTypeB, and/or TCI state, to the PDSCH. In some embodiments, if no list of indexes is configured in the PDSCH-Config IE, a UE may use an nth index among all configured sets of resources for an nth instance of a configured parameter.

In a second embodiment, a separate PDSCH-Config IE per TRP may be configured for a UE in which each PDSCH-config IE only contains RRC parameters related to PDSCH transmitted from one TRP (e.g., having a corresponding index), and the index may be included in the PDSCH-Config IE. In such embodiments, the UE applies the TRP specifically configured RRC PDSCH parameters, such as data scrambling ID, dmrs-DownlinkForPDSCH-MappingTypeA, dmrs-DownlinkForPDSCH-MappingTypeB, and/or TCI state, to a received PDSCH if the scheduling DCI is received in a set of resources with the corresponding index. In some embodiments, if an index is not included in a PDSCH-Config IE, a UE may assume that an nth configured PDSCH-Config IE is associated with an nth index among all the configured sets of resources.

Figure 4:
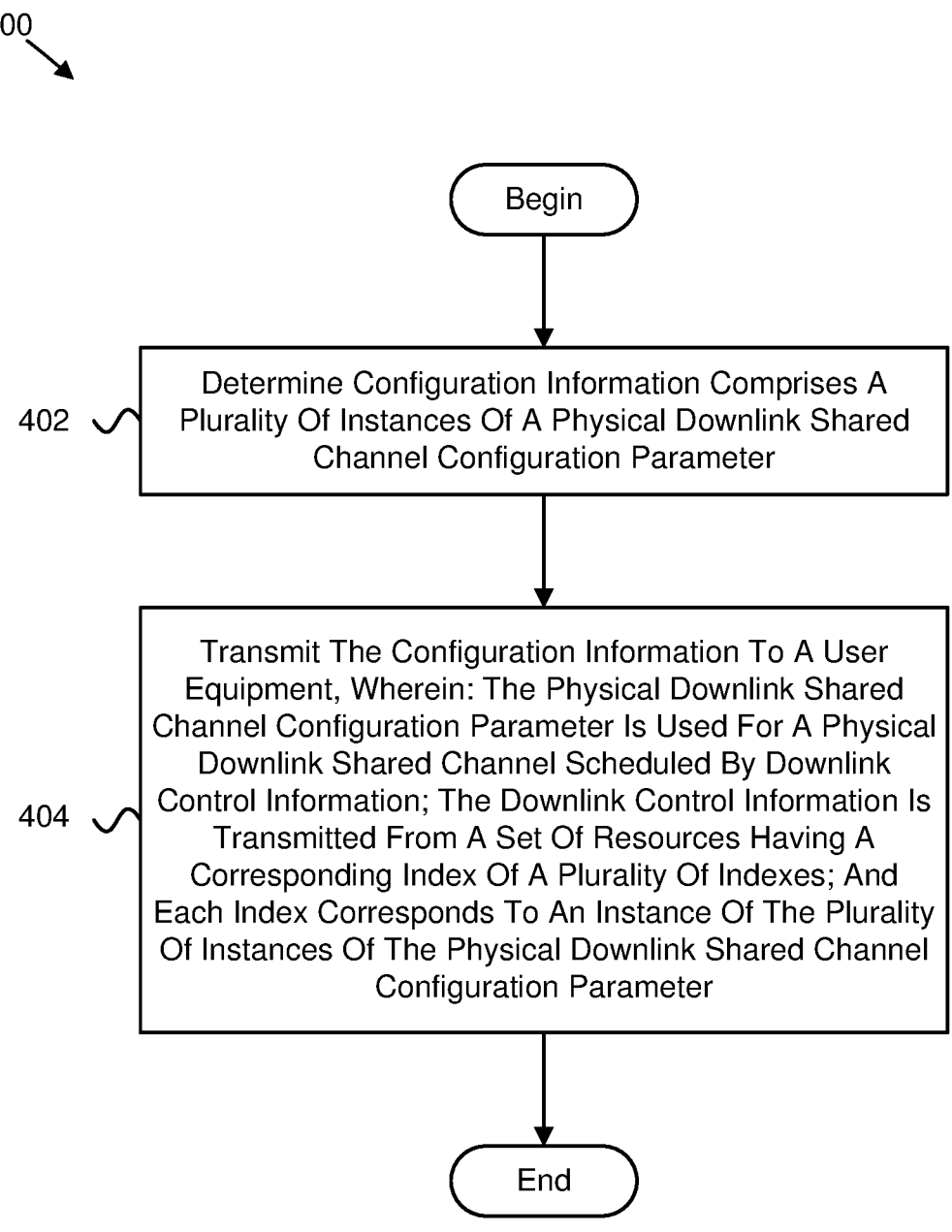
FIG. 4 is a schematic flow chart diagram illustrating one embodiment of a method for transmitting information for PDSCH configurations.

FIG. 4 is a schematic flow chart diagram illustrating one embodiment of a method 400 for transmitting information for PDSCH configurations. In some embodiments, the method 400 is performed by an apparatus, such as the network unit 104. In certain embodiments, the method 400 may be performed by a processor executing program code, for example, a microcontroller, a microprocessor, a CPU, a GPU, an auxiliary processing unit, a FPGA, or the like.

The method 400 may include determining 402 configuration information comprising a plurality of instances of a physical downlink shared channel configuration parameter. In certain embodiments, the method 400 includes transmitting 404 the configuration information to a user equipment, wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

In certain embodiments, each index of the plurality of indexes corresponds to at least one control resource set (e.g., one or more CORESETs). In some embodiments, the configuration information comprises a plurality of instances of selected physical downlink shared channel configuration parameters of a plurality of physical downlink shared channel configuration parameters. In various embodiments, the plurality of instances of the physical downlink shared channel configuration parameter is part of a single physical downlink shared channel configuration.

In one embodiment, one instance of at least one physical downlink shared channel configuration parameter corresponds to the plurality of indexes (e.g., one instance of a parameter is used for all indexes). In certain embodiments, the single physical downlink shared channel configuration comprises a list of the plurality of indexes, and instances of the plurality of instances of the physical downlink shared channel configuration parameter are mapped to the indexes in the list of the plurality of indexes. In some embodiments, in response to the configuration information not mapping instances of the plurality of instances of the physical downlink shared channel configuration parameter to the plurality of indexes, the instances of the plurality of instances of the physical downlink shared channel configuration parameter are mapped to the plurality of indexes in ascending order. For example, a first listed instance of the physical downlink shared channel configuration parameter in a list of instances of the physical downlink shared channel configuration parameter is mapped to a lowest index, a second listed instance of the physical downlink shared channel configuration parameter in the list of instances of the physical downlink shared channel configuration parameter is mapped to a second lowest index, and so forth.

In various embodiments, each instance of the plurality of instances of the physical downlink shared channel configuration parameter is in a separate physical downlink shared channel configuration. In one embodiment, the separate physical downlink shared channel configuration comprises an index of the plurality of indexes. In certain embodiments, in response to the separate physical downlink shared channel configuration not comprising an index of the plurality of indexes, the separate physical downlink shared channel configuration is mapped to the plurality of indexes in ascending order. For example, the first physical downlink shared channel configuration that is configured is mapped to a lowest index, the second physical downlink shared channel configuration that is configured is mapped to a second lowest index, and so forth.

In some embodiments, the configuration information comprises one or more physical downlink shared channel configuration parameters comprising dataScramblingIdentityPDSCH, dmrs-DownlinkForPDSCH-MappingTypeA, dmrs-DownlinkForPDSCH-MappingTypeB, tci-StatesToAddModList, tci-StatesToReleaseList, resourceAllocation, pdsch-TimeDomainAllocationList, pdsch-AggregationFactor, rbg-Size, mcs-Table, prb-BundleSize, or some combination thereof.

FIG. 5 is a schematic flow chart diagram illustrating one embodiment of a method 500 for receiving information for PDSCH configurations. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

The method 500 may include receiving 502 configuration information from a network device, wherein: the configuration information comprises a plurality of instances of a physical downlink shared channel configuration parameter; the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

In certain embodiments, each index of the plurality of indexes corresponds to at least one control resource set. In some embodiments, the configuration information comprises a plurality of instances of selected physical downlink shared channel configuration parameters of a plurality of physical downlink shared channel configuration parameters. In various embodiments, the plurality of instances of the physical downlink shared channel configuration parameter is part of a single physical downlink shared channel configuration.

In one embodiment, one instance of at least one physical downlink shared channel configuration parameter corresponds to the plurality of indexes. In certain embodiments, the single physical downlink shared channel configuration comprises a list of the plurality of indexes, and instances of the plurality of instances of the physical downlink shared channel configuration parameter are mapped to the indexes in the list of the plurality of indexes. In some embodiments, the method 500 further comprises, in response to the configuration information not mapping instances of the plurality of instances of the physical downlink shared channel configuration parameter to the plurality of indexes, mapping the instances of the plurality of instances of the physical downlink shared channel configuration parameter to the plurality of indexes in ascending order.

In various embodiments, each instance of the plurality of instances of the physical downlink shared channel configuration parameter is in a separate physical downlink shared channel configuration. In one embodiment, the separate physical downlink shared channel configuration comprises an index of the plurality of indexes. In certain embodiments, the method 500 further comprises, in response to the separate physical downlink shared channel configuration not comprising an index of the plurality of indexes, mapping the separate physical downlink shared channel configuration to the plurality of indexes in ascending order.

In some embodiments, the configuration information comprises one or more physical downlink shared channel configuration parameters comprising dataScramblingIdentityPDSCH, dmrs-DownlinkForPDSCH-MappingTypeA, dmrs-DownlinkForPDSCH-MappingTypeB, tci-StatesToAddModList, tci-StatesToReleaseList, resourceAllocation, pdsch-TimeDomainAllocationList, pdsch-AggregationFactor, rbg-Size, mcs-Table, prb-BundleSize, or some combination thereof.

In one embodiment, a method comprises: determining configuration information comprising a plurality of instances of a physical downlink shared channel configuration parameter; and transmitting the configuration information to a user equipment, wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

In certain embodiments, each index of the plurality of indexes corresponds to at least one control resource set.

In some embodiments, the configuration information comprises a plurality of instances of selected physical downlink shared channel configuration parameters of a plurality of physical downlink shared channel configuration parameters.

In various embodiments, the plurality of instances of the physical downlink shared channel configuration parameter is part of a single physical downlink shared channel configuration.

In one embodiment, one instance of at least one physical downlink shared channel configuration parameter corresponds to the plurality of indexes.

In certain embodiments, the single physical downlink shared channel configuration comprises a list of the plurality of indexes, and instances of the plurality of instances of the physical downlink shared channel configuration parameter are mapped to the indexes in the list of the plurality of indexes.

In some embodiments, in response to the configuration information not mapping instances of the plurality of instances of the physical downlink shared channel configuration parameter to the plurality of indexes, the instances of the plurality of instances of the physical downlink shared channel configuration parameter are mapped to the plurality of indexes in ascending order.

In various embodiments, each instance of the plurality of instances of the physical downlink shared channel configuration parameter is in a separate physical downlink shared channel configuration.

In one embodiment, the separate physical downlink shared channel configuration comprises an index of the plurality of indexes.

In certain embodiments, in response to the separate physical downlink shared channel configuration not comprising an index of the plurality of indexes, the separate physical downlink shared channel configuration is mapped to the plurality of indexes in ascending order.

In some embodiments, the configuration information comprises one or more physical downlink shared channel configuration parameters comprising dataScramblingIdentityPDSCH, dmrs-DownlinkForPDSCH-MappingTypeA, dmrs-DownlinkForPDSCH-MappingTypeB, tci-StatesToAddModList, tci-StatesToReleaseList, resourceAllocation, pdsch-TimeDomainAllocationList, pdsch-AggregationFactor, rbg-Size, mcs-Table, prb-BundleSize, or some combination thereof.

In one embodiment, an apparatus comprises: a processor that determines configuration information comprising a plurality of instances of a physical downlink shared channel configuration parameter; and a transmitter that transmits the configuration information to a user equipment, wherein: the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

In certain embodiments, each index of the plurality of indexes corresponds to at least one control resource set.

In some embodiments, the configuration information comprises a plurality of instances of selected physical downlink shared channel configuration parameters of a plurality of physical downlink shared channel configuration parameters.

In various embodiments, the plurality of instances of the physical downlink shared channel configuration parameter is part of a single physical downlink shared channel configuration.

In one embodiment, one instance of at least one physical downlink shared channel configuration parameter corresponds to the plurality of indexes.

In certain embodiments, the single physical downlink shared channel configuration comprises a list of the plurality of indexes, and instances of the plurality of instances of the physical downlink shared channel configuration parameter are mapped to the indexes in the list of the plurality of indexes.

In some embodiments, in response to the configuration information not mapping instances of the plurality of instances of the physical downlink shared channel configuration parameter to the plurality of indexes, the instances of the plurality of instances of the physical downlink shared channel configuration parameter are mapped to the plurality of indexes in ascending order.

In various embodiments, each instance of the plurality of instances of the physical downlink shared channel configuration parameter is in a separate physical downlink shared channel configuration.

In one embodiment, the separate physical downlink shared channel configuration comprises an index of the plurality of indexes.

In certain embodiments, in response to the separate physical downlink shared channel configuration not comprising an index of the plurality of indexes, the separate physical downlink shared channel configuration is mapped to the plurality of indexes in ascending order.

In some embodiments, the configuration information comprises one or more physical downlink shared channel configuration parameters comprising dataScramblingIdentityPDSCH, dmrs-DownlinkForPDSCH-MappingTypeA, dmrs-DownlinkForPDSCH-MappingTypeB, tci-States-ToAddModList, tci-StatesToReleaseList, resourceAllocation, pdsch-TimeDomainAllocationList, pdsch-AggregationFactor, rbg-Size, mcs-Table, prb-BundleSize, or some combination thereof.

In one embodiment, a method comprises: receiving configuration information from a network device, wherein: the configuration information comprises a plurality of instances of a physical downlink shared channel configuration parameter; the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

In certain embodiments, each index of the plurality of indexes corresponds to at least one control resource set.

In some embodiments, the configuration information comprises a plurality of instances of selected physical downlink shared channel configuration parameters of a plurality of physical downlink shared channel configuration parameters.

In various embodiments, the plurality of instances of the physical downlink shared channel configuration parameter is part of a single physical downlink shared channel configuration.

In one embodiment, one instance of at least one physical downlink shared channel configuration parameter corresponds to the plurality of indexes.

In certain embodiments, the single physical downlink shared channel configuration comprises a list of the plurality of indexes, and instances of the plurality of instances of the physical downlink shared channel configuration parameter are mapped to the indexes in the list of the plurality of indexes.

In some embodiments, the method further comprises, in response to the configuration information not mapping instances of the plurality of instances of the physical downlink shared channel configuration parameter to the plurality of indexes, mapping the instances of the plurality of instances of the physical downlink shared channel configuration parameter to the plurality of indexes in ascending order.

In various embodiments, each instance of the plurality of instances of the physical downlink shared channel configuration parameter is in a separate physical downlink shared channel configuration.

In one embodiment, the separate physical downlink shared channel configuration comprises an index of the plurality of indexes.

In certain embodiments, the method further comprises, in response to the separate physical downlink shared channel configuration not comprising an index of the plurality of indexes, mapping the separate physical downlink shared channel configuration to the plurality of indexes in ascending order.

In some embodiments, the configuration information comprises one or more physical downlink shared channel configuration parameters comprising dataScramblingIdentityPDSCH, dmrs-DownlinkForPDSCH-MappingTypeA, dmrs-DownlinkForPDSCH-MappingTypeB, tci-States-ToAddModList, tci-StatesToReleaseList, resourceAllocation, pdsch-TimeDomainAllocationList, pdsch-AggregationFactor, rbg-Size, mcs-Table, prb-BundleSize, or some combination thereof.

In one embodiment, an apparatus comprises: a receiver that receives configuration information from a network device, wherein: the configuration information comprises a plurality of instances of a physical downlink shared channel configuration parameter; the physical downlink shared channel configuration parameter is used for a physical downlink shared channel scheduled by downlink control information; the downlink control information is transmitted from a set of resources having a corresponding index of a plurality of indexes; and each index corresponds to an instance of the plurality of instances of the physical downlink shared channel configuration parameter.

In certain embodiments, each index of the plurality of indexes corresponds to at least one control resource set.

In some embodiments, the configuration information comprises a plurality of instances of selected physical downlink shared channel configuration parameters of a plurality of physical downlink shared channel configuration parameters.

In various embodiments, the plurality of instances of the physical downlink shared channel configuration parameter is part of a single physical downlink shared channel configuration.

In one embodiment, one instance of at least one physical downlink shared channel configuration parameter corresponds to the plurality of indexes.

In certain embodiments, the single physical downlink shared channel configuration comprises a list of the plurality of indexes, and instances of the plurality of instances of the physical downlink shared channel configuration parameter are mapped to the indexes in the list of the plurality of indexes.

In some embodiments, the processor, in response to the configuration information not mapping instances of the plurality of instances of the physical downlink shared channel configuration parameter to the plurality of indexes, maps the instances of the plurality of instances of the physical downlink shared channel configuration parameter to the plurality of indexes in ascending order.

In various embodiments, each instance of the plurality of instances of the physical downlink shared channel configuration parameter is in a separate physical downlink shared channel configuration.

In one embodiment, the separate physical downlink shared channel configuration comprises an index of the plurality of indexes.

In certain embodiments, the processor, in response to the separate physical downlink shared channel configuration not comprising an index of the plurality of indexes, maps the separate physical downlink shared channel configuration to the plurality of indexes in ascending order.

In some embodiments, the configuration information comprises one or more physical downlink shared channel configuration parameters comprising dataScramblingIdentityPDSCH, dmrs-DownlinkForPDSCH-MappingTypeA, dmrs-DownlinkForPDSCH-MappingTypeB, tci-States-ToAddModList, tci-StatesToReleaseList, resourceAllocation, pdsch-TimeDomainAllocationList, pdsch-AggregationFactor, rbg-Size, mcs-Table, prb-BundleSize, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a base station, the method comprising:

determining configuration information comprising a plurality of instances of a same physical downlink shared channel (PDSCH) configuration parameter within a single PDSCH configuration, and a mapping of each instance of the plurality of instances of the PDSCH configuration parameter to a corresponding index of a plurality of indexes comprising control resource set (CORESET) pool indexes; and transmitting the configuration information to a user equipment (UE), wherein:

the PDSCH configuration parameter is used for a PDSCH scheduled by downlink control information (DCI);

the DCI is transmitted from a set of resources having a corresponding index of a plurality of indexes; and the corresponding index of the set of resources indicates to the UE to select, for use, the single corresponding instance of the plurality of instances of the PDSCH configuration parameter based on a CORESET pool index of a resource of the set of resources from which the DCI is transmitted, wherein, in response to the configuration information omitting a mapping between the plurality of instances of the PDSCH configuration parameter and the plurality of indexes, the base station maps the plurality of instances of the PDSCH configuration parameter to the plurality of indexes in ascending order of the indexes.

2. A base station, comprising:

a memory; and at least one processor coupled with the memory and configured to cause the base station to:

determine configuration information comprising a plurality of instances of a same physical downlink shared channel (PDSCH) configuration parameter within a single PDSCH configuration, and a mapping of each instance of the plurality of instances of the PDSCH configuration parameter to a corresponding index of a plurality of indexes comprising control resource set (CORESET) pool indexes; and transmit the configuration information to a user equipment (UE), wherein:

the PDSCH configuration parameter is used for a PDSCH scheduled by downlink control information (DCI);

the DCI is transmitted from a set of resources having a corresponding index of a plurality of indexes; and the corresponding index of the set of resources indicates to the UE to select, for use, the single corresponding instance of the plurality of instances of the PDSCH configuration parameter based on a CORESET pool index of a resource of the set of resources from which the DCI is transmitted, wherein, in response to the configuration information omitting a mapping between the plurality of instances of the PDSCH configuration parameter and the plurality of indexes, the base station maps the plurality of instances of the PDSCH configuration parameter to the plurality of indexes in ascending order of the indexes.

3. The base station of claim 2, wherein each index of the plurality of indexes corresponds to at least one control resource set.

4. The base station of claim 2, wherein the configuration information comprises a plurality of instances of selected PDSCH configuration parameters of a plurality of PDSCH configuration parameters.

5. The base station of claim 2, wherein the plurality of instances of the PDSCH configuration parameter is part of a single PDSCH configuration.

6. The base station of claim 5, wherein one instance of at least one PDSCH configuration parameter corresponds to the plurality of indexes.

7. The base station of claim 5, wherein the single PDSCH configuration comprises a list of the plurality of indexes, and instances of the plurality of instances of the PDSCH configuration parameter are mapped to the indexes in the list of the plurality of indexes.

8. The base station of claim 5, wherein, in response to the configuration information not mapping instances of the plurality of instances of the PDSCH configuration parameter to the plurality of indexes, the instances of the plurality of instances of the PDSCH configuration parameter are mapped to the plurality of indexes in ascending order.

9. The base station of claim 2, wherein each instance of the plurality of instances of the PDSCH configuration parameter is in a separate PDSCH configuration.

10. The base station of claim 9, wherein the separate PDSCH configuration comprises an index of the plurality of indexes.

11. The base station of claim 9, wherein, in response to the separate PDSCH configuration not comprising an index of the plurality of indexes, the separate PDSCH configuration is mapped to the plurality of indexes in ascending order.

12. The base station of claim 2, wherein the configuration information comprises one or more PDSCH configuration parameters comprising dataScramblingIdentityPDSCH, dmrs-DownlinkForPDSCH-MappingTypeA, dmrs-DownlinkForPDSCH-MappingTypeB, tci-StatesToAddModList, tci-StatesToReleaseList, resourceAllocation, pdsch-TimeDomainAllocationList, pdsch-AggregationFactor, rbg-Size, mcs-Table, prb-BundleSize, or some combination thereof.

13. A user equipment (UE), comprising:

at least one memory; and at least one processor coupled with the at least one memory and configured to cause the UE to:

receive configuration information from a base station, wherein:

the configuration information comprising a plurality of instances of a same physical downlink shared channel (PDSCH) configuration parameter within a single PDSCH configuration, and a mapping of each instance of the plurality of instances of the PDSCH configuration parameter to a corresponding index of a plurality of indexes comprising control resource set (CORESET) pool indexes;

the PDSCH configuration parameter is used for a PDSCH scheduled by downlink control information (DCI);

the DCI is transmitted from a set of resources having a corresponding index of a plurality of indexes; and the corresponding index of the set of resources indicates to the UE to select, for use, the single corresponding instance of the plurality of instances of the PDSCH configuration parameter based on a CORESET pool index of a resource of the set of resources from which the DCI is transmitted, wherein, in response to the configuration information omitting a mapping between the plurality of instances of the PDSCH configuration parameter and the plurality of indexes, the UE applies a mapping determined according to a rule that associates the plurality of instances with the plurality of indexes in ascending order of the indexes.

14. The UE of claim 13, wherein each index of the plurality of indexes corresponds to at least one control resource set.

15. The UE of claim 13, wherein the configuration information comprises a plurality of instances of selected PDSCH configuration parameters of a plurality of PDSCH configuration parameters.

16. The UE of claim 13, wherein the plurality of instances of the PDSCH configuration parameter is part of a single PDSCH configuration.

17. The UE of claim 16, wherein one instance of at least one PDSCH configuration parameter corresponds to the plurality of indexes.

18. The UE of claim 16, wherein the single PDSCH configuration comprises a list of the plurality of indexes, and instances of the plurality of instances of the PDSCH configuration parameter are mapped to the indexes in the list of the plurality of indexes.

19. The UE of claim 16, wherein the at least one processor, in response to the configuration information not mapping instances of the plurality of instances of the PDSCH configuration parameter to the plurality of indexes, maps the instances of the plurality of instances of the PDSCH configuration parameter to the plurality of indexes in ascending order.

20. The UE of claim 13, wherein each instance of the plurality of instances of the PDSCH configuration parameter is in a separate PDSCH configuration.

* * * * *